United States Patent Office 3,383,370
Patented May 14, 1968

3,383,370
PROCESS AND COMPOSITION OF MATTER
Adel F. Halasa, Akron, Ohio, assignor to The Firestone Tire & Rubber Company, Akron, Ohio, a corporation of Ohio
No Drawing. Filed Feb. 21, 1966, Ser. No. 528,801
9 Claims. (Cl. 260—79.5)

This invention relates to N-oxadiethylenethiocarbamyl-N',N'-dimethylsulfenamide, its use as an accelerator in vulcanization of diolefin rubbers and the vulcanizates.

Preparation of accelerator

Although the compound may be made by other methods, the following is illustrative:

The thiocarbamylsulfenamide accelerator is prepared by the reaction of sodium N-oxadiethylenedithiocarbamate and N-chlorodimethylamine in an aqueous, non-aqueous or mixed aqueous non-aqueous medium.

Preparation of sodium N-oxadiethylenedithiocarbamate

The reaction is carried out in a four-necked flask fitted with a thermometer, a reflux condenser, an adding funnel and a mechanical stirrer. A mixture of sodium hydroxide (12.0 gr., 0.30 mole), morpholine (26.1 gr., 0.30 mole) and 30 ml. of water is placed in the flask and cooled to +10° C. To this cooled solution is added carbon disulfide (22.8 gr., 0.30 mole) dropwise while maintaining the temperature below 25° C. After the addition of carbon disulfide is complete, 20 ml. of water is added and the reaction mixture is warmed to 40–45° C. and maintained at this temperature for 45 minutes. At the end of this time, the reaction mixture is homogeneous and is used as such in the subsequent reaction.

Preparation of N-chlorodimethylamine

In a three-necked flask fitted with a thermometer, an adding funnel and a mechanical stirrer is placed 135.0 gr. (3.0 moles) of dimethylamine. The reaction flask is cooled to −20° C. and 0.35 mole of sodium hypochlorite solution (2.1–2.6 molar) is added dropwise maintaining the temperature below −10° C. The addition requires about 90 minutes. When the addition is complete, 35–45 ml. of 40–50 percent aqueous sulfuric acid is added (maintaining the temperature at −10 to −15° C.) to adjust the pH of the solution to about 12.0. The N-chlorodimethylamine solution thus prepared is used in the next step.

Preparation of N-oxadiethylenethiocarbamyl-N',N'-dimethylsulfenamide

The sodium N-oxadiethylenedithiocarbamate solution prepared as above is added dropwise to the cold (−20 to −30° C.) solution of the N-chlorodimethylamine solution (prepared above) at such a rate as to maintain a temperature below −5° C. This addition is as rapid as possible with rapid stirring. When the addition is complete, the product is collected on a filter, washed neutral with cold water and air dried. The product obtained in 92–94 percent yield melted at 77–79° C. and has good shelf stability.

Vulcanization

The following is given as illustrative of the use of the compound as an accelerator, it being understood that other formulae may be employed using other rubbers, using any usual compounding formula with different antioxidant, etc. In each of the formulae, all amounts refer to parts by weight.

In this test the following master batch is used:

| | |
|---|---|
| SBR 1500 | 100 |
| HAF black | 50 |
| Zinc oxide | 3 |
| Softener | 8 |
| Stearic acid | 2 |
| Antioxidant | 0.6 |
| Total | 163.6 |

The foregoing was milled with 2 parts of sulfur and with a commercial accelerator and different amounts of the new accelerator as indicated in the following table, with results on curing at 300° F. for the indicated lengths of time as recorded there. The modulus and tensile strength are given in pounds per square inch and the elongation is reported in percent.

TABLE I

| | | | | | | | | | |
|---|---|---|---|---|---|---|---|---|---|
| Masterbatch | 163.6 | 163.6 | 163.6 | 163.6 | 163.6 | 163.6 | 163.6 | 163.6 | 163.6 |
| Sulfur | 2.0 | 2.0 | 2.0 | 2.0 | 2.0 | 2.0 | 2.0 | 2.0 | 2.0 |
| Commercial Accelerator | 1.2 | | | | | | | | |
| Test Material | | 0.35 | 0.40 | 0.45 | 0.50 | 0.55 | 0.60 | 0.65 | 0.70 |
| Total | 166.8 | 165.95 | 166.00 | 166.05 | 166.10 | 166.15 | 166.20 | 166.25 | 166.30 |
| Mooney scorch at 265° F.: | | | | | | | | | |
| Ts(Vm+1) | 30.0 | 28.0 | 26.0 | 27.5 | 26.5 | 26.0 | 25.5 | 26.5 | 26.0 |
| Tc(Vm+10) | >40.0 | 37.5 | 36.0 | 37.0 | 35.0 | 35.0 | 34.5 | 35.5 | 34.0 |
| Vm | 22.5 | 23.0 | 23.0 | 22.5 | 23.0 | 22.5 | 23.0 | 23.0 | 23.0 |
| Normal Physical Properties, 300% Modulus: | | | | | | | | | |
| 20 min | 1,375 | 1,025 | 1,300 | 1,500 | 1,875 | 1,900 | 2,025 | 2,125 | 2,225 |
| 40 min | 2,275 | 1,575 | 1,800 | 2,025 | 2,150 | 2,225 | 2,375 | 2,450 | 2,575 |
| 80 min | 2,250 | 1,650 | 1,875 | 2,075 | 2,225 | 2,250 | 2,300 | 2,475 | 2,525 |
| Tensile Strength: | | | | | | | | | |
| 20 min | 3,600 | 3,325 | 3,525 | 3,600 | 3,675 | 3,800 | 3,350 | 3,275 | 3,075 |
| 40 min | 3,050 | 3,275 | 3,475 | 3,425 | 3,400 | 2,950 | 3,200 | 3,350 | 2,800 |
| 80 min | 3,425 | 3,425 | 3,525 | 3,375 | 3,300 | 3,075 | 3,300 | 2,750 | 2,675 |
| Ultimate Elongation, Percent: | | | | | | | | | |
| 20 min | 540 | 610 | 570 | 520 | 480 | 480 | 420 | 390 | 370 |
| 40 min | 370 | 480 | 460 | 430 | 400 | 360 | 370 | 380 | 330 |
| 80 min | 380 | 470 | 430 | 420 | 390 | 360 | 380 | 330 | 320 |

A further test was made with oil-extended rubber (SBR which contained 37.5 parts of oil in 100 parts of copolymer), using the following masterbatch for tire-tread stock:

| | |
|---|---|
| Oil-extended SBR | 137.5 |
| Pigments [1] | 71.0 |
| Total | 208.5 |

[1] Consisting of reinforcing carbon black, antioxidant, zinc oxide and stearic acid.

Sulfur and accelerator were added, as indicated in the table and the stocks were cured at 300° F. with the following results:

TABLE II

| Masterbatch | 208.5 | 208.5 | 208.5 | 208.5 | 208.5 | 208.5 | 208.5 | 208.5 | 208.5 |
|---|---|---|---|---|---|---|---|---|---|
| Sulfur | 2.2 | 2.2 | 2.2 | 2.2 | 2.2 | 2.2 | 2.2 | 2.2 | 2.2 |
| Commercial accelerator | 1.2 | | | | | | | | |
| Test Material | | 0.35 | 0.40 | 0.45 | 0.50 | 0.55 | 0.60 | 0.65 | 0.70 |
| Total | 211.9 | 211.05 | 211.10 | 211.15 | 211.20 | 211.25 | 211.30 | 211.35 | 211.40 |
| Mooney Scorch at 265° F.: | | | | | | | | | |
| $Ts(Vm+1)$ | 31.5 | 27.0 | 25.0 | 23.5 | 23.5 | 24.0 | 23.0 | 23.5 | 23.5 |
| $Tc(Vm+10)$ | 40.0 | 34.5 | 36.5 | 30.5 | 30.5 | 31.0 | 29.5 | 29.5 | 30.0 |
| Vm | 20.5 | 21.5 | 21.5 | 21.5 | 21.5 | 21.5 | 21.0 | 21.5 | 21.0 |
| Normal Physical Properties: | | | | | | | | | |
| 300% Modulus: | | | | | | | | | |
| 20 min | 850 | 550 | 775 | 750 | 825 | 925 | 1,050 | 1,125 | 1,300 |
| 40 min | 1,350 | 875 | 1,125 | 1,075 | 1,050 | 1,225 | 1,275 | 1,325 | 1,425 |
| 80 min | 1,375 | 975 | 1,150 | 1,125 | 1,175 | 1,225 | 1,375 | 1,350 | 1,425 |
| 400% Modulus: | | | | | | | | | |
| 20 min | 1,400 | 975 | 1,300 | 1,225 | 1,400 | 1,575 | 1,750 | 1,800 | 2,025 |
| 40 min | 2,100 | 1,450 | 1,800 | 1,800 | 1,800 | 1,925 | 2,025 | 2,100 | 2,200 |
| 80 min | 2,150 | 1,650 | 1,850 | 1,800 | 1,875 | 1,975 | 2,150 | 2,125 | 2,200 |
| Tensile Strength: | | | | | | | | | |
| 20 min | 2,975 | 2,575 | 2,975 | 2,825 | 3,000 | 3,075 | 2,950 | 3,075 | 3,025 |
| 40 min | 3,025 | 3,125 | 2,925 | 3,025 | 2,925 | 2,950 | 2,975 | 3,200 | 2,925 |
| 80 min | 2,975 | 3,125 | 2,975 | 2,975 | 3,375 | 3,425 | 3,075 | 3,300 | 2,975 |
| Ultimate Elongation (Percent): | | | | | | | | | |
| 20 min | 650 | 760 | 710 | 700 | 680 | 660 | 590 | 590 | 560 |
| 40 min | 520 | 680 | 590 | 590 | 510 | 560 | 550 | 540 | 510 |
| 80 min | 500 | 630 | 510 | 580 | 600 | 600 | 540 | 550 | 510 |

In a further test, a tire-tread stock was used which was prepared from a mixture of a commercial linear polybutadiene (a solution polymer) and an oil-extended SBR copolymer. Sulfur and accelerator were added as indicated in Table III and the stocks were cured at 300° F. giving vulcanizates with the properties recorded in the table.

TABLE III

| Masterbatch | 218.88 | 218.88 | 218.88 | 218.88 | 218.88 | 218.88 | 218.88 | 218.88 | 218.88 |
|---|---|---|---|---|---|---|---|---|---|
| Sulfur | 1.7 | 1.7 | 1.7 | 1.7 | 1.7 | 1.7 | 1.7 | 1.7 | 1.7 |
| Commercial Accelerator | 1.4 | | | | | | | | |
| Test Material | | 0.35 | 0.40 | 0.45 | 0.50 | 0.55 | 0.60 | 0.65 | 0.70 |
| Total | 221.98 | 220.93 | 220.98 | 221.03 | 221.08 | 221.13 | 221.18 | 221.23 | 221.28 |
| Mooney Scorch at 265° F.: | | | | | | | | | |
| $Ts(Vm+1)$ | 25 | 22.5 | 21.5 | 20 | 19 | 17 | 17.5 | 16.5 | 16.5 |
| $Tc(Vm+10)$ | 30 | 29 | 26.5 | 25 | 23.5 | 22 | 21.5 | 21 | 21 |
| Vm | 20.5 | 21.5 | 21.5 | 21 | 21 | 21.5 | 21.5 | 21.5 | 21 |
| Normal Physical Properties: | | | | | | | | | |
| 300% Modulus: | | | | | | | | | |
| 20 min | 850 | 450 | 550 | 625 | 750 | 850 | 850 | 900 | 950 |
| 40 min | 950 | 575 | 625 | 675 | 800 | 850 | 875 | 950 | 975 |
| 80 min | 875 | 500 | 550 | 575 | 725 | 750 | 775 | 825 | 925 |
| 400% Modulus: | | | | | | | | | |
| 20 min | 1,450 | 750 | 925 | 1,100 | 1,275 | 1,375 | 1,450 | 1,550 | 1,575 |
| 40 min | 1,625 | 900 | 1,050 | 1,150 | 1,350 | 1,400 | 1,475 | 1,525 | 1,625 |
| 80 min | 1,550 | 850 | 950 | 1,025 | 1,200 | 1,300 | 1,325 | 1,350 | 1,525 |
| Tensile Strength: | | | | | | | | | |
| 20 min | 2,725 | 1,700 | 2,175 | 2,350 | 2,400 | 2,400 | 2,325 | 2,675 | 2,600 |
| 40 min | 2,550 | 1,975 | 2,225 | 2,325 | 2,450 | 2,650 | 2,400 | 2,600 | 2,450 |
| 80 min | 2,525 | 1,675 | 2,000 | 2,275 | 2,375 | 2,425 | 2,500 | 2,500 | 2,550 |
| Ultimate Elongation (percent): | | | | | | | | | |
| 20 min | 600 | 730 | 700 | 650 | 610 | 580 | 550 | 580 | 550 |
| 40 min | 550 | 680 | 660 | 620 | 600 | 610 | 560 | 550 | 530 |
| 80 min | 560 | 670 | 650 | 670 | 630 | 610 | 610 | 590 | 560 |

In the tables:

Vm=Mooney at minimum viscosity.

Ts(Vm+1)=Time to start of cure which is the time in minutes required for increase in the Mooney of the stock from minimum viscosity to 1 Mooney unit above minimum viscosity.

Tc(Vm+10)=Time to substantial cure which is the time in minutes required for increase in the Mooney of the stock from minimum viscosity to 10 Mooney units above minimum viscosity.

The above physical tests and Mooney scorch values show that the new compound is an effective, delayed-action accelerator of the vulcanization of diolefin rubbers. A smaller amount is required than with the accelerators widely used commercially; e.g. about 40 to 50 percent of the amount of the commercial accelerator of the above tables which is generally considered the most satisfactory available at the present time for general purpose factory use. At these levels, the scorch times, Ts and Tc, are slightly below those of the best commercial accelerator, but still well within the range for satisfactory use in tire stocks in the factory.

The compound is effective in rubber compounds, latex compounds or other conventional types of vulcanizable compounds of rubber, reclaimed rubber or synthetic rubber, and consistently produces very rapid curing compositions, which in the vulcanized state possess unusually high modulus, tensile and abrasion-resisting properties. The rubbers which may be used include natural rubber and diolefin synthetic rubbers vulcanizable by heating with sulfur including polybutadiene, polyisoprene, various copolymers of conjugated diolefins and vinyl compounds, such as SBR (copolymer of butadiene and styrene) and NBR (copolymer of butadiene and acrylonitrile), copolymers of butadiene or isoprene with alpha-methyl-styrene, ring-substituted styrenes, chloromethyl styrene, etc., butadiene-isoprene copolymer, isobutylene-isoprene, butadiene-vinylpyridine copolymers and terpolymers, EPDM rubbers (terpolymers of ethylene, propylene and a non-conjugated diolefin, e.g. dicyclopentadiene), such rubbers also being known as EPT or ethylene-propylene terpolymers. Although elemental sulfur has hereinabove been mentioned as the preferred vulcanizing agent, sulfur-donor vulcanizing agents (for example, the known phenolic polysulfides, amine polysulfides and thiuram disulfides) are contemplated. Although usually no more than about 2 or 3 parts of the accelerator will be used for 100 parts of rubber, the amount used may vary from 0.1 to 5 parts per 100 parts of the rubber. The vulcanization is carried out at any usual vulcanization temperature.

Although the invention relates to the production of both soft and semi-hard vulcanized rubbers, it is particularly directed to the production of improved soft rubber vulcanizates from natural and/or synthetic rubbers. The level of sulfur in compositions for production of such soft rubber vulcanizates ranges from about 0.2 to about 12 parts by weight of available sulfur per 100 parts of the rubber, it being understood that the sulfur can be employed as elemental sulfur or as available sulfur present in a sulfur-bearing curing agent of the sulfur-donor type.

What I claim is:

1. N-oxadiethylenethiocarbamyl - N',N' - dimethylsulfenamide.

2. A vulcanizable composition comprising a sulfur-vulcanizable diolefin rubber, sulfur and between 0.5 and 5 parts of the compound of claim 1 per 100 parts of the rubber.

3. The composition of claim 2 in which the rubber is butadiene-styrene copolymer.

4. The composition of claim 2 in which the rubber is a polybutadiene.

5. The composition of claim 2 in which the rubber is a polyisoprene.

6. The method of producing a vulcanizate which comprises heating the composition of claim 2.

7. The method of producing a vulcanizate which comprises heating the composition of claim 3.

8. The method of producing a vulcanizate which comprises heating the composition of claim 4.

9. The method of producing a vulcanizate which comprises heating the composition of claim 5.

References Cited

UNITED STATES PATENTS

| 2,337,802 | 12/1943 | Dean | 260—793 |
|---|---|---|---|
| 2,875,260 | 2/1959 | Alliger et al. | 260—793 |

JOSEPH L. SCHOFER, *Primary Examiner.*

D. DENENBERG, *Assistant Examiner.*